(12) United States Patent
Coates et al.

(10) Patent No.: US 9,033,101 B2
(45) Date of Patent: *May 19, 2015

(54) SOUND ABSORPTION MATERIAL AND METHOD OF MANUFACTURING SOUND ABSORPTION MATERIAL

(71) Applicant: Zephyros, Inc., Romeo, MI (US)

(72) Inventors: Michael William Coates, Glen Iris (AU); Marek Henryk Kierzkowski, Ferntree Gully (AU); Philip John Gibbons, Hughesdale (AU)

(73) Assignee: ZEPHYROS, INC., Romeo, MI (US)

( * ) Notice: Subject to any disclaimer, the term of this patent is extended or adjusted under 35 U.S.C. 154(b) by 189 days.

This patent is subject to a terminal disclaimer.

(21) Appl. No.: 13/729,830

(22) Filed: Dec. 28, 2012

(65) Prior Publication Data

US 2013/0192921 A1 Aug. 1, 2013

Related U.S. Application Data

(63) Continuation of application No. 12/994,103, filed as application No. PCT/AU2008/001812 on Dec. 9, 2008, now Pat. No. 8,365,862.

(60) Provisional application No. 61/055,741, filed on May 23, 2008.

(51) Int. Cl.
*E04B 1/82* (2006.01)
*E04B 1/84* (2006.01)
(Continued)

(52) U.S. Cl.
CPC ............... *E04B 1/8409* (2013.01); *B32B 5/08* (2013.01); *B32B 5/26* (2013.01); *B32B 7/12* (2013.01);
(Continued)

(58) Field of Classification Search
USPC ................ 181/284, 290, 291, 294, 286, 296; 156/60, 308.2; 428/216, 218; 442/278, 442/411, 414, 415
See application file for complete search history.

(56) References Cited

U.S. PATENT DOCUMENTS

| 3,214,323 A | 10/1965 | Russell et al. |
| 3,978,179 A | 8/1976 | Sundhauss |

(Continued)

FOREIGN PATENT DOCUMENTS

| DE | 6930307 | 12/1969 |
| DE | 19714348 | 2/2008 |

(Continued)

OTHER PUBLICATIONS

Korean Office Action dated Feb. 22, 2013.
(Continued)

*Primary Examiner* — Edgardo San Martin
(74) *Attorney, Agent, or Firm* — The Dobrusin Law Firm. P.C.

(57) ABSTRACT

Described embodiments relate to a method of manufacturing a sound absorption material. The method comprises: forming a low density fibrous web to act as porous bulk absorber, the fibrous web containing a proportion of bi-components fibers, each bi-component fiber having a core material and a sheath material around the core material; applying a thin facing later to the low density fibrous web, wherein the facing layer is adhesively compatible with the sheath material; heating the fibrous web to a temperature sufficient to soften the sheath material of at least some of the bi-component fibers; and pressing the facing layer and fibrous web together under low pressure such that at least part of the facing layer contacts the softened sheath material of at least some of the bi-component fibers to form an adhesive bond between the facing layer and the fibrous web.

20 Claims, 9 Drawing Sheets

(51) Int. Cl.
| | |
|---|---|
| *B32B 5/08* | (2006.01) |
| *B32B 5/26* | (2006.01) |
| *B32B 7/12* | (2006.01) |
| *B32B 27/02* | (2006.01) |
| *B32B 27/12* | (2006.01) |
| *B32B 27/32* | (2006.01) |
| *B32B 27/34* | (2006.01) |
| *B32B 27/36* | (2006.01) |
| *B32B 37/12* | (2006.01) |
| *D04H 1/54* | (2012.01) |
| *D04H 1/74* | (2006.01) |
| *D04H 13/00* | (2006.01) |
| *E04B 1/76* | (2006.01) |
| *G10K 11/162* | (2006.01) |
| *B32B 37/15* | (2006.01) |
| *E04B 1/74* | (2006.01) |
| *B32B 37/04* | (2006.01) |
| *B32B 37/20* | (2006.01) |

(52) U.S. Cl.
CPC .............. *B32B 27/02* (2013.01); *B32B 27/12* (2013.01); *B32B 27/32* (2013.01); *B32B 27/34* (2013.01); *B32B 27/36* (2013.01); *B32B 37/04* (2013.01); *B32B 37/1207* (2013.01); *B32B 37/203* (2013.01); *B32B 2037/1238* (2013.01); *B32B 2305/22* (2013.01); *B32B 2307/304* (2013.01); *D04H 1/54* (2013.01); *D04H 1/74* (2013.01); *D04H 13/006* (2013.01); *D04H 13/007* (2013.01); *E04B 1/7662* (2013.01); *E04B 2001/7687* (2013.01); *G10K 11/162* (2013.01); *B32B 37/15* (2013.01)

(56) References Cited

U.S. PATENT DOCUMENTS

| | | | |
|---|---|---|---|
| 4,131,664 A * | 12/1978 | Flowers et al. | 264/510 |
| 4,392,522 A | 7/1983 | Bschorr | |
| 5,401,567 A | 3/1995 | Knobloch | |
| 5,591,289 A * | 1/1997 | Souders et al. | 156/148 |
| 6,220,388 B1 * | 4/2001 | Sanborn | 181/290 |
| 6,390,563 B1 | 5/2002 | Haverkamp et al. | |
| 6,524,691 B2 * | 2/2003 | Sugawara et al. | 428/292.4 |
| 7,226,656 B2 * | 6/2007 | Coates et al. | 428/221 |
| 7,427,575 B2 * | 9/2008 | Shaffer | 442/415 |
| 7,497,509 B2 * | 3/2009 | Omiya et al. | 296/198 |
| 7,500,541 B2 * | 3/2009 | Schmidt et al. | 181/290 |
| 7,591,346 B2 * | 9/2009 | Thompson et al. | 181/291 |
| 7,709,405 B2 * | 5/2010 | Wenstrup et al. | 442/415 |
| 7,757,811 B2 * | 7/2010 | Fox et al. | 181/291 |
| 7,867,601 B2 | 1/2011 | Ikishima et al. | |
| 7,918,313 B2 * | 4/2011 | Gross et al. | 181/294 |
| 8,118,177 B2 * | 2/2012 | Drapela et al. | 210/504 |
| 8,194,879 B2 * | 6/2012 | Ishikawa et al. | 381/86 |
| 8,322,487 B1 * | 12/2012 | Kitchen et al. | 181/294 |
| 8,365,862 B2 * | 2/2013 | Coates et al. | 181/290 |
| 8,496,088 B2 * | 7/2013 | Kitchen et al. | 181/290 |
| 2001/0015249 A1 | 8/2001 | Mohr | |
| 2002/0160682 A1 * | 10/2002 | Zeng et al. | 442/411 |
| 2003/0068943 A1 | 4/2003 | Fay | |
| 2003/0176131 A1 * | 9/2003 | Tilton | 442/361 |
| 2004/0077247 A1 * | 4/2004 | Schmidt et al. | 442/382 |
| 2004/0111817 A1 | 6/2004 | Chen et al. | |
| 2004/0176003 A1 | 9/2004 | Yang et al. | |
| 2004/0231915 A1 * | 11/2004 | Thompson et al. | 181/290 |
| 2004/0238275 A1 | 12/2004 | Keller et al. | |
| 2006/0090958 A1 * | 5/2006 | Coates et al. | 181/290 |
| 2006/0105664 A1 | 5/2006 | Zafiroglu | |
| 2006/0137799 A1 * | 6/2006 | Haque et al. | 156/62.2 |
| 2006/0289231 A1 * | 12/2006 | Priebe et al. | 181/290 |
| 2008/0050565 A1 | 2/2008 | Gross et al. | |
| 2008/0057283 A1 * | 3/2008 | Blinkhorn et al. | 428/292.1 |
| 2008/0064794 A1 | 3/2008 | Murdock et al. | |
| 2008/0073146 A1 * | 3/2008 | Thompson et al. | 181/291 |
| 2009/0148644 A1 | 6/2009 | Francis | |
| 2011/0139543 A1 * | 6/2011 | Coates et al. | 181/290 |

FOREIGN PATENT DOCUMENTS

| | | |
|---|---|---|
| GB | 823203 | 11/1959 |
| JP | 10-146909 A | 6/1998 |
| JP | 10-237978 | 8/1998 |
| JP | 10-237978 | 9/1998 |
| JP | 11-508328 A | 7/1999 |
| JP | 2001-228879 A | 8/2001 |
| JP | 2004-291549 A | 10/2004 |
| JP | 2007-25044 A | 1/2007 |
| WO | 03/000976 | 1/2003 |
| WO | 2005/081226 | 9/2005 |

OTHER PUBLICATIONS

Chinese Office Action dated Feb. 4, 2013.
European Extended Search Report dated Oct. 4, 2012.
Bies Reference 1 of 7; Engineering Noise Control Theory and Practice; 3$^{rd}$ Edition (2003).
Bies Reference 2 of 7; Engineering Noise Control Theory and Practice; 3$^{rd}$ Edition (2003).
Bies Reference 3 of 7; Engineering Noise Control Theory and Practice; 3$^{rd}$ Edition (2003).
Bies Reference 4 of 7; Engineering Noise Control Theory and Practice; 3$^{rd}$ Edition (2003).
Bies Reference 5 of 7; Engineering Noise Control Theory and Practice; 3$^{rd}$ Edition (2003).
Bies Reference 6 of 7; Engineering Noise Control Theory and Practice; 3$^{rd}$ Edition (2003).
Bies Reference 7 of 7; Engineering Noise Control Theory and Practice; 3$^{rd}$ Edition (2003).
Uno Ingard 1994.
Japanese Office Action dated Sep. 17, 2013; Appln. No. 2011-509814.
Translation of Japanese Final Rejection Office Action dated Sep. 9, 2014 (Appl. No. 2011-509814).
Korean Notice of Preliminary Rejection dated Mar. 12, 2015; Application No. KR10-2010-7028868.

* cited by examiner

SOUND ABSORPTION MATERIAL AND METHOD OF MANUFACTURING SOUND ABSORPTION MATERIAL

TECHNICAL FIELD

The described embodiments relate generally to processes for manufacture of sound absorption material and materials produced by such processes.

BACKGROUND

Sound absorption materials are used in a variety of applications including motor vehicles, machinery and buildings. These materials act to reduce noise transmission and/or reflection in the particular application and can be made from fibrous materials.

It is desired to address or ameliorate one or more disadvantages or shortcomings associated with existing sound absorption materials and/or methods of manufacturing such materials, or to at least provide a useful alternative thereto.

SUMMARY

Certain embodiments relate to a method of manufacturing a sound absorption material. The method comprises forming a low density fibrous web to act as a porous bulk absorber, the fibrous web containing a plurality of bi-component fibres, each bi-component fibre having a core material and a sheath material around the core material, the sheath material having a lower melting point than the core material. The method further comprises applying a facing layer to the fibrous web, the racing layer being adhesively compatible with the sheath material. The method further comprises heating the fibrous web to a temperature sufficient to soften the sheath material of at least some of the bi-component fibres. The method further comprises pressing the facing layer and fibrous web together under low pressure such that at least part of the facing layer contacts the softened sheath material of at least some of the bi-component fibres to form an adhesive bond between the facing layer and the fibrous web.

The facing layer may comprise a film layer having a thickness of between 5 and 100 microns. The thickness may alternatively be between about 10 and 25 microns. Alternatively, the thickness of the film layer may be about 15 microns. The thinner the film, the better, as long as it has sufficient structural integrity to resist being damaged or destroyed during normal handling.

The fibrous web may have a thickness of between about 4 and 50 millimeters before being pressed together with the film layer. Alternatively, the thickness of the fibrous web may be between about 4 and 25 millimeters. Although various thicknesses can be used for the fibrous web, a practical maximum thickness is about 50 millimeters and a practical minimum thickness is about 4 millimeters.

The low pressure under which the facing layer and fibrous web are pressed together may be such that the fibrous web is compressed by between about 5% and 80% of its thickness. This pressure may be applied evenly across the fibrous web to increase bulk density substantially throughout the fibrous web.

The temperature to which the fibrous web is heated to soften the sheath material of the bi-component fibres depends upon the physical properties of the sheath material. For a polyethylene sheath, the temperature may be about 140° C. to about 160° C. Alternatively, the temperature may be about 150° C. For a polypropylene sheath, the temperature may be higher, for example about 180° C.

According to some embodiments, the method may further comprise applying a second facing layer to a second face of the fibrous web, the second facing layer being adhesively compatible with the sheath material. The pressing may comprise pressing the second facing layer and the fibrous web together under low pressure such that at least part of the second facing layer contacts the softened sheath of at least some of the bi-component fibres to form an adhesive bond between the second facing layer and the fibrous web. The second facing layer may comprise the same material as the first facing layer. Alternatively, the materials of the first and second facing layers may be different, in which case the thicknesses of the facing layers may be different.

According to further embodiments, the fibrous web may be a first fibrous web and the method may further comprise pressing a second low density fibrous web together with the second facing layer under low pressure to adhere a first side of the second fibrous web to the second facing layer. The second fibrous web may comprise a proportion of bi-component fibres that each have a core material and a sheath material in the manner of the bi-component fibres described above in relation to the first fibrous web.

The method may further comprise, prior to pressing a second fibrous web together with the second facing layer, applying an adhesive substance to the first side of the second fibrous web. The adhesive substance may be adhesively compatible with both the second facing layer and the second fibrous web. The adhesive substance may be provided in the form of a hot melt adhesive powder, web, net, spray, or film form. The method may further comprise activating the hot melt adhesive substance just prior to bringing the second fibrous web into contact with the second film, so as to form a permanent bond between the two layers. The hot melt adhesive may comprise one of a polyethylene, polypropylene, EVA, of polyamide, or other adhesively compatible polymer with an appropriate melt temperature. The adhesive substance may also comprise a water or solvent based adhesive system, or may comprise a pressure sensitive adhesive applied in accordance with known lamination processes.

The method may further comprise applying a third facing layer to a second side of the second fibrous web. The third facing layer may be adhesively compatible with the sheath of the bi-component fibres of the second fibrous web. The method may further comprise heating the second fibrous web to a temperature sufficient to soften the sheath material of at least some of the bi-component fibres. The method may further comprise pressing the third facing layer and the second fibrous web together under low pressure such that at least past of the third facing layer contacts the softened sheath material of at least some of the bi-component fibres to form an adhesive bond between the third facing layer and the second fibrous web.

The bi-component fibres may be blended within the structure of the fibrous web. The bi-component fibres are formed of short lengths chopped from extruded bi-component fibres. The core of the bi-component fibres may have a linear mass density of between about 2 and about 6 Denier per fibre filament. The bi-component fibres may have a sheath to core ratio (in cross-sectional area) of about 25% to 35% for example about 30%. The bi-component fibres may have a staple length between about 3-4 millimeters up to around 70 millimeters for carded fibrous webs. For examples described herein, the length of the bi-component fibres is between about 32 to about 64 millimeters, with an average or common length of about 51 millimeters staple length, being typical of those used in fibre carding processes. Short bicomponent fibres may be used in some other nonwoven processes, such as the formation of air laid fibrous webs.

The facing layer may be adhered only to the sheath material of the bi-component fibres in the fibrous web. In some embodiments, the low density fibrous web is a porous bulk absorber with an air flow resistivity of more than about 1,000 and less than about 60,000 mks Rayls/m. The air flow resistivity may alternatively be between about 2,500 and about 40,000 mks Rayls/m or between about 3,000 and about 20,000 mks Rayls/m. The air flow resistivity may alternatively be about 5,600 mks Rayls/m.

The low density fibrous web may have a bulk density of less than about 120 kg/m$^3$. Alternatively, the density may be less than about 60 kg/m$^3$. Alternatively, the density may be less than about 30 kg/m$^3$. Alternatively, the density may fee less than about 15 kg/m$^3$. The density may be as low as about 10 kg/m$^3$, but will generally be higher due to practical considerations, such as mechanical integrity. The density of the examples described herein vary between about 14 and about 56 kg/m$^3$.

In some embodiments, the facing layer may comprise a linear low density coextruded polyethylene film of about 15 microns thickness.

The fibrous web may be produced by a nonwoven manufacturing process involving blending adhesive bi-component fibres and conventional staple fibres and forming a web. The fibrous web may be formed by cross lapped, vertically lapped, air-laid, or other typical nonwoven web-forming processes. After web formation, the fibrous web may be bonded by through air bonding, or may be mechanically consolidated, for example by a needling process. Subsequent to mechanical consolidation, the fibrous web may be thermally bonded. The described embodiments are not limited in relation to fibre orientation.

The adhesive sheath material of the bi-component fibres may be formed from low surface energy polymers that are adhesively compatible with the selected facing layer or layers. Polymers for the adhesive sheath of the bi-component fibres may be selected from the group consisting of polyethylene, polypropylene, polyamide and co-polyester. The core of the bi-component fibres may be polyester, for example.

BRIEF DESCRIPTION OF THE DRAWINGS

Embodiments are described in further detail below by way of example only, with reference to the accompanying drawings and examples, in which.

DETAILED DESCRIPTION

In dry lamination, a thermoplastic resin is melted to cause adhesion between the facing material and the substrate. In some cases, the facing may comprise a low melting point material that will itself net as a "self-adhesive" facing with the application of heat. Alternatively, an adhesive may be applied in the form of a dry thermoplastic hot melt resin in the form of powder, web, net, spray, or film. The heat to melt the adhesive resin is applied by direct contact, for example hot calendar, or indirectly, for example infra-red radiation or hot air. The adhesive must be selected carefully so as to ensure a good adhesion both to the facing and substrate. For good adhesion, the surface energy of the adhesive must be less than the surface energy of the substrate.

In wet lamination, water and solvent based adhesives are used to provide adhesion between a facing material and a substrate. Again, the adhesive must be selected carefully so as to ensure a good adhesion to both the facing and the substrate.

Apart from surface energy, the parameters defining effective adhesion by dry lamination, of a facing to a fibrous web are temperature, pressure, and the period for which the heat is applied. If the contact time is short, as with a hot roller, then adhesion requires the use of relatively high temperatures and higher pressures. This compromises the thickness of the fibrous web unless it has sufficient density to resist the compressive effects of hot roller lamination.

The addition of a thin membrane facing to a porous bulk absorber can provide much greater sound absorption than for the porous bulk, absorber alone. The thin impermeable film acts as a membrane sound absorber, exhibiting a peak in sound absorption corresponding to the resonant frequency of the film and the depth of space behind the membrane, which corresponds with the thickness of the porous bulk absorber. In addition, the porous bulk absorber couples to the membrane and provides a mechanical and acoustic impedance to the overall system, thus providing a broad spectrum of sound absorption around the resonant frequency of the membrane.

To achieve effective sound absorption over a broad spectrum, the porous bulk absorber should have a low modulus so that it does not impart stiffness to the membrane. In other words, the porous bulk absorber, which is in this instance a fibrous web acting as a laminating substrate, should be as soft as is feasible, or have a low compliance. In addition, the film membrane should also be soft and flexible. For example, a light elastic film is appropriate as the film membrane. In an ideal situation the membrane would simply be placed onto the substrate without any adhesion at all, however this must be rendered into practice so that the membrane is allowed to float as freely as possible relative to the porous bulk absorber, while still maintaining adhesion thereto. This requires that the fibrous web, acting as the porous bulk absorber, be particularly soft, and that the film facing layer is adhered with a high degree of flexibility so that the film facing layer, acting as a membrane, has a high degree of freedom.

Fibre-based porous bulk sound absorption materials with impermeable single or double-sided thin film facings can be used to achieve a very lightweight, highly sound-absorbing composite that provides sound absorption equivalent to much thicker and heavier unfaced materials. These laminates can be manufactured using cross-laid thermally bonded porous bulk fibrous absorbers. However, fibrous webs having fibres that are aligned to some extent in the vertical direction (that is in the direction perpendicular to the machine, and cross, direction of the web), demonstrate superior mechanical integrity and resistance to delamination due to the orientation of the fibres. Such a construction can be found in vertically-laid thermally bonded porous bulk fibrous absorbers, manufactured for instance by the Struto or V-Lap processes, and is also found to a lesser degree in some airlaid nonwoven fibrous webs.

Thin membrane-faced sound absorbers can use less raw material, and can be produced with less energy, and can provide more sound absorption and significantly reduced environmental impact compared with heavier, less efficient porous bulk absorbers. These laminates can be manufactured using hot melt adhesive films, applied through a flat bed laminator under controlled temperature, pressure and contact time. The expensive hot melt films can be replaced by thin plastic films, such as those used in diaper manufacture, adhered to the web by a scatter application of hot melt, adhesive powder or similarly effective adhesive applied to the fibrous web.

Because powder scatter application can only be applied to one side of a web, a hot melt film can be applied to the underside of the web, and a powder scatter application and thin plastic film can be applied to the upper side of the web, so producing a double-faced laminate, ie a fibrous web with both a first and second facing layer. This laminate has the advantage of providing a product which, when applied in use in a vehicle, for example, does not require separate left and right handed components.

Described embodiments relate to the production of sound absorption materials having a self-laminating fibrous web that will adhere to a compatible facing layer, without the need for any adhesive layers, and eliminate the need for the use of any additional adhesives, such as adhesive powders, webs, films, or nets, or any other form of adhesive. The adhesion provided is sufficiently strong, but quite flexible, allowing the membrane to float relatively freely, and optimising the resultant sound absorption.

Some described embodiments involve producing single-side film faced sound absorption material without the need to use either a hot melt film or any additional adhesives, such as adhesive powders, webs, films, or nets. Some described embodiments involve producing double-side film faced sound absorption materials in a single lamination process without the need to use either a hot melt film or any additional adhesives, such as adhesive powders, webs, films or nets. Further embodiments involve two porous hulk absorber layers with a film facing layer therebetween and film facing layers on each outside face of the double-layered porous bulk absorber material.

Figure 1:
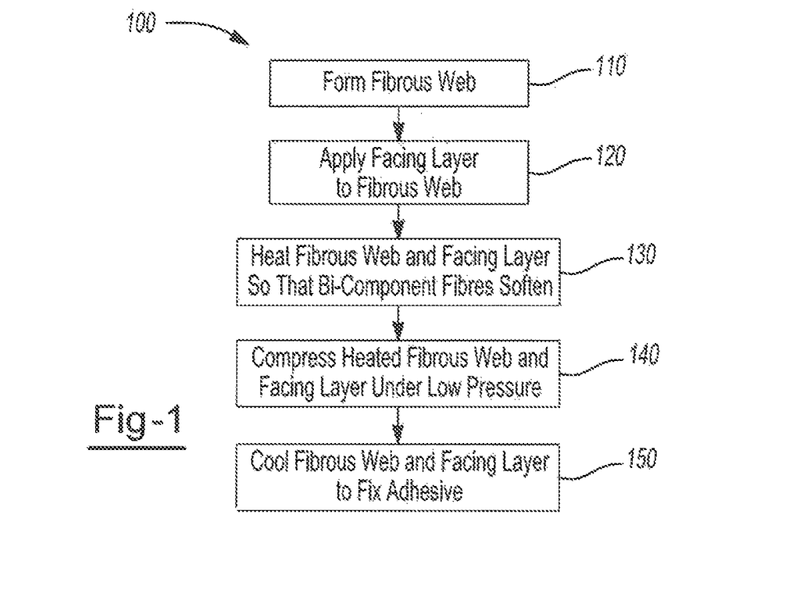
FIG. 1 is a flowchart of an embodiment of a method of manufacture of a sound absorption material.

Referring now to FIG. 1, a flowchart of a method 100 for manufacturing a sound absorption material is described in further detail.

A sound absorption material of the described embodiments can be produced according to method 100, which starts at step 110 by forming and mechanically consolidating or thermally bonding a low density (porous) fibrous web with a plurality of bi-component fibres blended within it. Step 110 may comprise a web forming process 700 as described below in relation to FIG. 7. Each bi-component fibre has a core material and an adhesive sheath, the sheath having a lower melting point than the core material. The blending of the bi-component fibres in the fibrous web may be performed by standard mixing or blending techniques to blend opened staple fibres with a proportion of opened bi-component fibres.

The temperature differences between the melting points of different core and sheath materials depend on the specific materials selected. However, the melting point of the sheath material should be sufficiently lower than the melting point of the core material in order to allow the core material to retain structural integrity while the sheath material softens at a temperature around its melting point temperature. For a polyethylene sheath material, for example, the melting point may be around 140 to 160° C. Alternatively, temperatures outside this range may still achieve softening of the polyethylene sheath material, while allowing structural integrity of the core material to be retained. In another example, a polypropylene sheath material may have a melting temperature in the order of 180° C. or so. Thus, the temperature at which the sheath material softens depends on the melting point of the particular sheath polymer selected to form the sheath material of the bi-component fibres.

The fibrous web can be formed by nonwoven processes including cross-lapping, vertical lapping, needle-punching, air laying or another suitable method of producing a blended web of non woven material, combined, with appropriate mechanical consolidation or thermal bonding so that the web can be handled. The low density fibrous web formed by this process acts as a porous bulk absorber and has an air flow resistivity of more than about 1,000 and less than about 60,000 mks Rayls/m. The air flow resistivity may alternatively be between about 2,500 and about 40,000 mks Rayls/m or between about 3,000 and about 20,000 mks Rayls/m. The air flow resistivity may alternatively be about 5,600 mks Rayls/m. The density of the fibrous web may be between about 10 kg/m$^3$ and about 120 kg/m$^3$.

Figure 8:
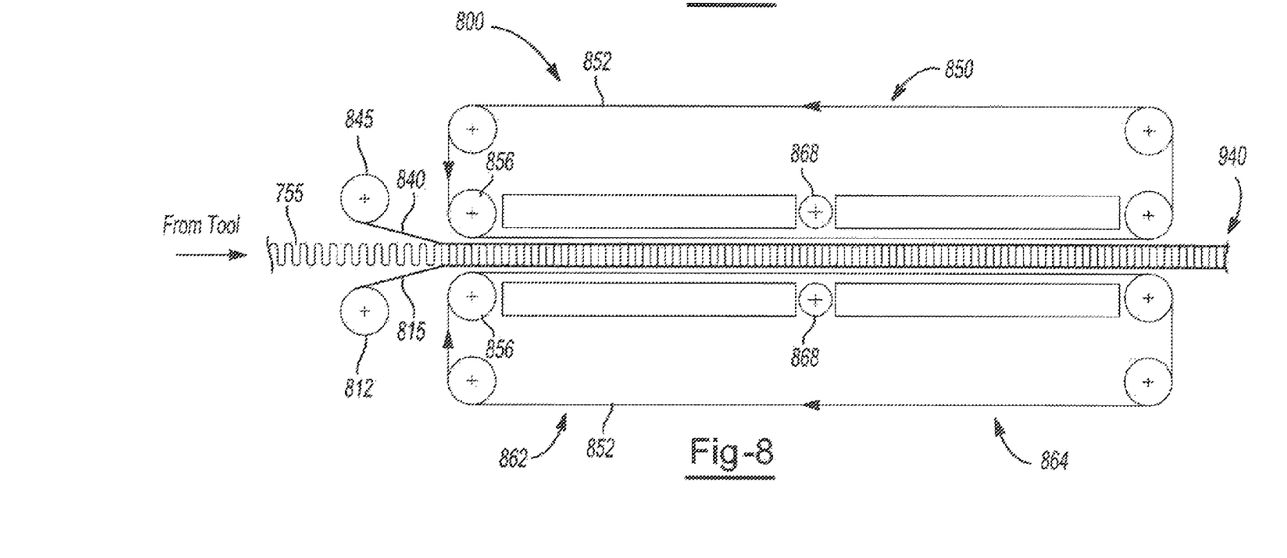
FIG. 8 is a schematic diagram of a system for producing a sound absorption material.

At step 120, a film layer is applied as a facing layer to the low density fibrous web and heat is applied at step 130 such that the sheath of the bi-component fibre softens. Steps 120 and 130 may be performed using a dry lamination system 800 as shown in FIG. 8. For example, for a polyethylene sheath material, the temperature may be between about 140° C. and about 160° C., and possibly about 150° C., for example.

The heat may be applied during (or immediately prior to) the application of the facing layer or afterwards. The amount of heating is controlled, and the facing layer is selected, such that under some circumstances only the sheath softens. Under other circumstances, where the facing layer comprises a film layer, the film may also soften to some extent but does not become molten. The temperature of the heating is selected so that the structural integrity of the fibrous web and film laminate is substantially maintained during the heating process. The core material has a sufficiently higher melting point than the sheath material to ensure that the core material substantially retains its structural integrity during the lamination despite the softening sheath.

The film layer is selected to be adhesively compatible with the material of the sheath so that an adhesive bond can be created between the sheaths of the bi-component fibres and the film. In other words, the sheath and film have relative surface energies such that they are able to form a strong adhesive bond. Suitable combinations of bi-component fibre and film include generally include polyethylene terephthalate (PET) as a core polymer, and another lower melting point polymer as an adhesive sheath, for example;

PET core bi-component fibre having a polyethylene sheath, with a polyethylene film;
    PET core bi-component fibre having a polypropylene sheath, with a polypropylene film;

PET core bi-component fibre having a polyamide sheath, with a polyamide film; and PET core bi-component fibre having a co-polyester sheath, with a polyester film.

These examples reflect the common forms of bicomponent fibre that are commercially available. However other combinations of core and sheath material are possible and the above examples should be construed as non-limiting.

In some embodiments, a combination of bi-component fibres of different types may be used. For example instead of the fibrous web having 30% PE/PET bi-component fibres, 10% CoPET/PET and 20% PE/PET bi-component fibres may be used. The ratio of bicomponent fibres will generally be selected so that the minimum amount of bicomponent fibre required to achieve suitable adhesion and mechanical integrity is used, so as to minimise cost associated with the more expensive bi-component fibres.

The film layer and fibrous web are brought together under low pressure at step 140, for example using a flat bed laminate 850 as shown in FIG. 8, such that at least part of the film layer contacts the softened sheaths of at least some of the bicomponent fibres to form an adhesive bond without substantial compression or plastic deformation of the fibrous web. The pressure applied to the fibrous web is to aid the adhesion of the film to the fibrous web and not to significantly change the thickness of the fibrous web. According to the Examples described herein, compression of the fibrous web and film layer did not result in the formation of a crust within the fibrous web. Formation of a crust would result in having increased stiffness and decreased sound absorption properties.

At step 150, the adhered fibrous web and facing layer are allowed to cool in order so fix the adhesive bond therebetween.

Although the above description, of method 100 refers to a single facing layer being laminated to the fibrous web, facing layers, cars are applied to both sides of the fibrous web at step 120 and the double faced fibrous web is heated at step 130 and compressed under relatively low pressure at step 140, as shown and described below in relation, to FIG. 8. The double film-faced porous bulk absorber has been found to be even more effective at sound absorption than the single film-faced bulk absorber.

Figure 6:
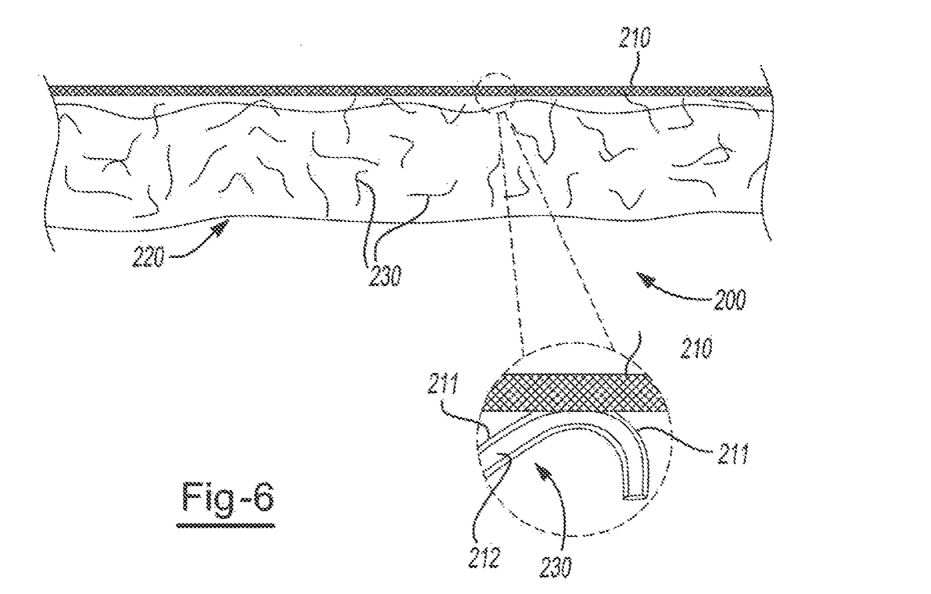
FIG. 6 is a schematic diagram of a sound absorption material shown in cross-section.

Referring now to FIG. 6, there is shown a cross-sectional schematic representation of a sound absorption material 200 according to some embodiments. The sound absorption material 200 comprises a facing layer 210 and a fibrous web 220 having a number of bi-component fibres 230 blended therein. The facing layer 210 is adhered to the fibrous web 220 by an adhesive bond formed between facing layer 210 and a sheath 211 of some of the bi-component fibres 230 located within fibrous web 220 adjacent the face of fibrous web 220 to which lacing layer 210 is applied.

Bi-component fibres 230 each have the sheath 211 formed around a core material 212. The sheath 211 has a melting point sufficiently lower than the melting point of core material 212 so that a temperature can be selected at which to melt or soften the sheath material 211 for adhesion to facing layer 210, without substantially affecting the structural integrity of the core material 212.

The fibrous web 220, facing layer 210 and bi-component fibres 230 of FIG. 6 have the properties described herein and may be used to form the sound absorption, material as described herein and/or according to the Examples.

Although, the sound absorption material 200 is shown in FIG. 6 as having only a single facing layer 210 applied to one side of the fibrous web 220, another facing layer, either being of the same material as facing layer 210 or another thin facing layer material as described herein, may be applied to the other side of the fibrous web 220, being adhered to the sheath material 211 of the bi-component fibres 230 in a similar manner. Either or both of the facing layers 210 may have material characteristics suitable for enabling ultrasonic welding of the sound absorption material 200 to a surface, such as a plastic moulding for the door trim of a vehicle. For such embodiments, the facing layer must be compatible with the material of the plastic molding substrate, which may in some embodiments comprise talc-filled polypropylene.

In some embodiments, the sound absorption material 200 may be made to have a density of about 350 gsm and be about 25 mm thick with a double sided film facing layer suitable for Ultrasonic welding to vehicle door trims. Provision of the sound absorption material 200 in such a manner can eliminate the need for anti-rattle pads to be applied to the vehicle, thereby reducing vehicle manufacturing costs and reducing the number of components needed to be installed in the vehicle. It has been found that a low density is desirable for achievement of effective sound absorption. This means that thick materials can be achieved with a relatively low amount of fibre, without sacrificing sound absorption for the purposes of achieving such anti-rattle properties.

Embodiments of sound, absorption materials described herein are generally characterised as being self-laminating as there is no need for adhesives to be used to adhere the facing layers to the fibrous web (except where noted below in relation to sound absorption materials having, a double layered fibrous web). Additionally, because the fibrous web used in the sound absorption material 200 or 1000 (FIG. 10) is low density, it is possible to manually handle large rolls of such materials without special lifting devices.

Fibrous web 220 may be a carded, vertically-lapped, thermally bonded web. Fibrous web 755 (FIG. 7) is an example of fibrous web 220. Alternative fibrous webs may include carded cross-lapped and needle punched webs, air-laid webs, melt-blown webs and combinations of these. Alternative web bonding types may include resin bonding and mechanical bonding, such as needle punching or hydro-entangling.

Pacing layer 210 may comprise a thin flexible cast coextruded film, such as is produced by Stellar films Group of Melbourne, Australia. The film may comprise a three-ply film consisting of linear low density polyethylene (LLDPE) with an adhesive tie-layer, for example. The film may have a small percentage of metallocene LLDPE in it to improve softness and mechanical properties, such as tear strength and elongation and to reduce noise. Other films, such as polypropylene and polyester films, may be used in alternative embodiments. However, metallocene polyolefins can be advantageous as they can provide improved mechanical properties, such as toughness, and can be used at lower thicknesses.

Steps 130 and 140 described above in relation to method 100 may be performed simultaneously, for example, by having the fibrous web and single or double thin facing layers feed into a flat-bed laminator 850 (FIG. 8) for dry lamination between heated Teflon belts. Such a laminator should allow for the application of gentle pressure over a period of time, so that the integrity of the fibrous web is not affected and the thickness of the fibrous web is not overly reduced during the lamination process. However, not all flat bed laminators are suitable. The top belt needs to be prevented from drooping, as this will reduce the thickness of the sound absorption material undesirably. As the fibrous web is commonly quite soft and cannot support the belt weight, particularly as the web is heated and the adhesive fibres soften, it is important that the top belt of the laminator does not droop.

The self-laminating fibrous web (by virtue of the film compatible bi-component fibres blended in the web) obviates the need for other common features of dry lamination systems, such as hot melt adhesives, powders, film, nets and webs. In effect, the sound absorption materials using a fibrous web with bi-component fibres blended therein can be seen as incorporating an adhesive web in the fibre blend.

The flat bed laminator 850 or 950 (FIG. 9) is configured to apply a specific temperature and pressure to the fibrous web or webs and film layer or layers for a predetermined period of time (controlled by adjusting the speed of progress of the material through the laminator).

Figure 7:
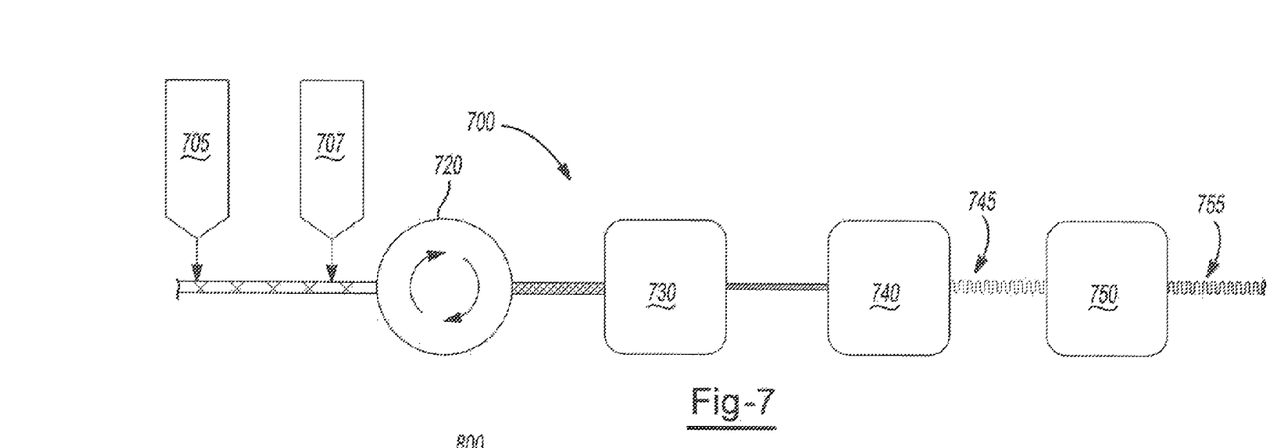
FIG. 7 is a schematic diagram of a process for producing a fibrous web for a sound absorption material.

Referring now to FIG. 7, a process 700 for forming a fibrous web 755 is described in further detail. The fibrous web 755 comprises a blend of standard polyester fibres 705 and bi-component fibres 707 that are opened and mixed in a bale opener and mixing system 720. The blended fibres are then carded using a carding system 730 before undergoing web formation 740. The output of the web formation 740 may be a vertically lapped but unbonded web 745, which is then passed through a thermal bonding system 750 to provide thermal bonding among the thermoplastic fibres of the vertically lapped web 745. The thermally bonded fibrous web 755 may then be used as the fibrous web 220 as part of the sound absorption material 200. Alternatively, the fibrous web 755 may be used in the formation of sound absorption materials, as shown and described in relation to FIGS. 8 to 11.

Referring now to FIG. 8, a system 800 for forming sound absorption material is described in further detail. System 800 may receive a bonded fibrous web 755, either directly from, the process 700 or unrolled from a roll of such fibrous web material. System 800 comprises a film unwinder (not shown) positioned to unwind film 815 from a roll 812 of such film to form the facing layer on one side of the fibrous web 755. Use fibrous web 755 and film 815 may be conveyed by a conveyor (not shown) to flat bed laminator 850.

If system 800 is to be used to produce a double film faced sound absorption material 940, a further film 840 is unwound from a roll 845 and applied to the face of fibrous web 755 that is opposite to the side on which film 815 is applied. Film 840 may be applied to the fibrous web 755 simultaneously with film 815 and film facing layers 815 and 840 are then fed into flat bed laminator 850 together.

Flat bed laminator 850 may have separated top and bottom belts 852, each passing over a series of rollers to convey the fibrous web 755 and film facing layers 815, 840 through the laminator 850. Rollers 856 are positioned at the entry of the laminator 850 to lightly press the materials together as they enter the laminator 850. Laminator 850 has a heating section 862 and a cooling section 864 for successively heating then cooling the material layers (755, 815 and 840) as they pass through. A nip roller 868 is located on both top and bottom belts 852 in between the heating and cooling sections 862, 864 to slightly compress the heated material layers (755, 813 and 840) together before they are cooled to fix the adhesion of the bi-component fibres of fibrous web 755 with the respective film layers 815, 840. The heating section 862 of laminator 850 is configured to heat the material to between about 140 degrees C. and about 160 degrees C.

Figure 9:
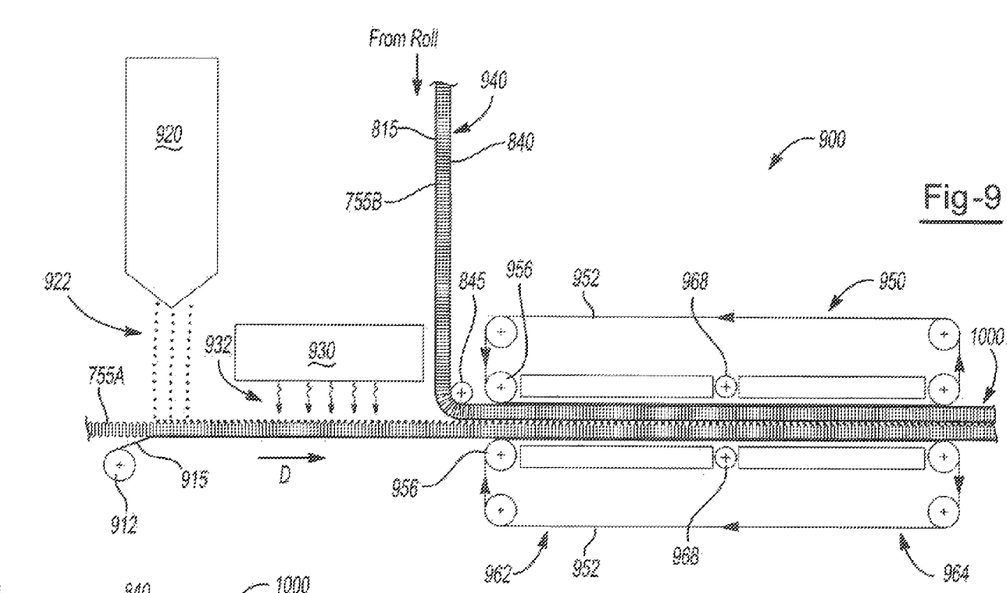
FIG. 9 is a schematic diagram of a system for producing a multi-layered sound absorption material.
Figure 10:
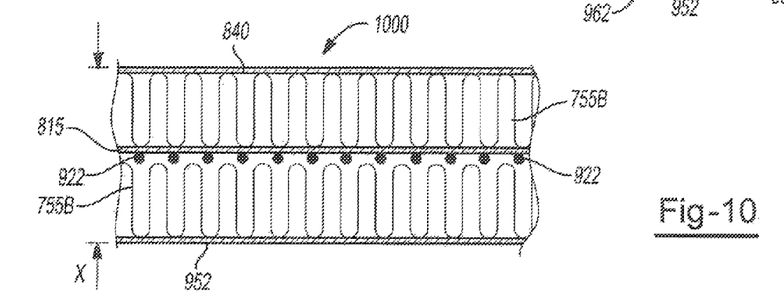
FIG. 10 is a cross-sectional view of the multi-layered sound absorption material.
Figure 11:
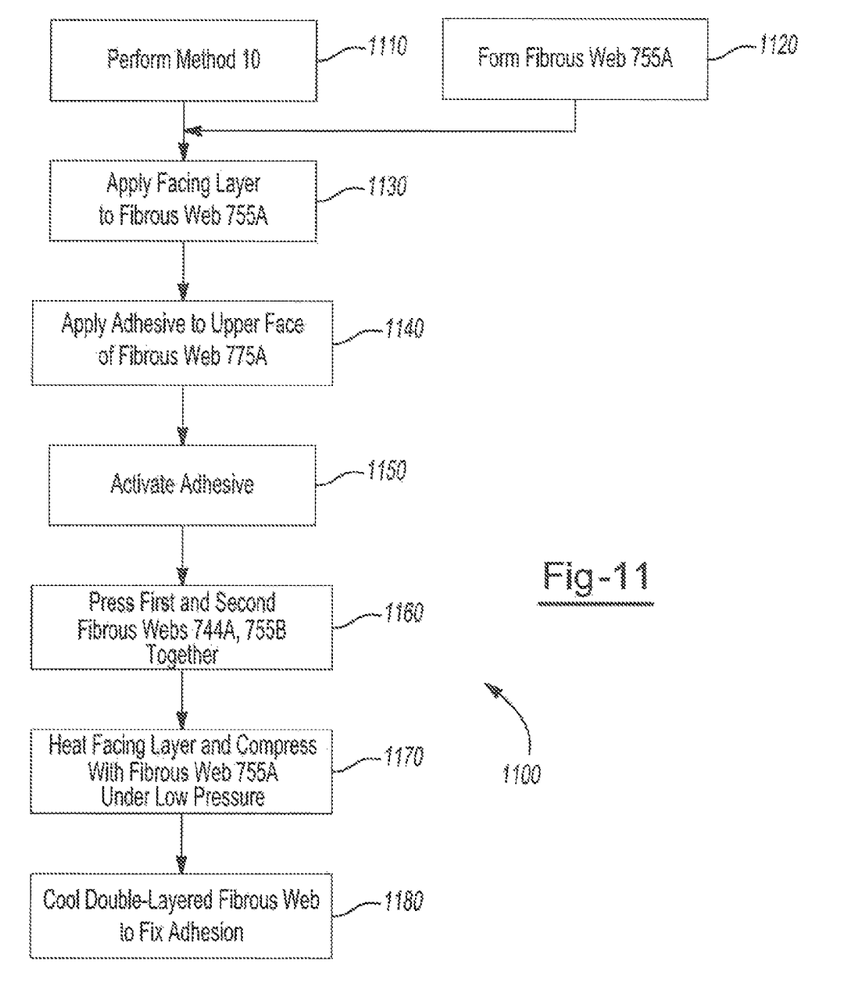
FIG. 11 is a flow chart of a method of producing a multi-layered sound absorption material.

Referring now to FIGS. 9 to 11, a system 900 for producing a sound absorption material 1000 according to method 1100 is described in further detail. System 900 is similar to system 800, except that, instead of film layer 840 being applied to one side of a fibrous web 755A, a double-faced, sound absorber 940, such as may be produced by system 800 according, to method 100 at step 1110, is applied as a second layer on top of the first fibrous web layer 755A. Additionally, as a flat bed laminator 950 will generally be inadequate to provide sufficient heat to achieve adhesion of the bi-component fibres in the fibrous web layer 755A with the film layer 815 of the fibrous web layer 755B, an activated adhesive, such as an adhesive powder, is applied to the exposed side of fibrous web layer 755A prior to application of the double-faced sound absorber and subsequently passing the double-layered fibrous web material, through flat bed laminator 950.

System 900 comprises a film mil 912 positioned in an unwinder (not shown) to apply (at step 1130) a film 915 as an external facing layer on one side of fibrous web. 755A formed by process 700 at step 1120. Fibrous web 755A and film layer 915 are passed through an adhesive applicator 920, such as a powder scattering unit, which scatters or otherwise applies (at step 1140) air adhesive substance 922, such as an adhesive powder, onto the side of the fibrous web 755A opposite to the side to which film 915 is applied. Adhesive substance 922 will generally be applied to an upwardly facing side of fibrous web 755A. Adhesive substance 922 is then activated at step 1150 as it passes through an activation mechanism 930, such as an infra-red heater that transmits infra-red radiation 932 to heat-activate the adhesive substance 922. Instead of an adhesive powder, a suitable adhesive film may be applied to fibrous web 755A using the adhesive applicator for subsequent activation and adhesion.

A roller 945 is used to apply the fibrous web layer 755B onto the exposed side of the first fibrous web layer 755A that has the activated adhesive thereon. The adhesive substance 922 is selected to be adhesively compatible with the film layer 815 and fibrous web 755A. The adhesive substance may comprise, for example, LDFE or polyamide powder.

In some embodiments, instead of applying adhesive to the top surface of the fibrous web 755A, heat may be applied to the top surface to soften the sheath material of the bi-component fibres 230, which cast then form a light adhesive bond when film facing layer 815 is lightly pressed together with fibrous web 755A. Thus, such embodiments may comprise no additional adhesive beyond the softened bi-component fibres in the fibrous web 755A and may substitute the described heating step for steps 1140 and 1150.

Flat bed laminator 950 may have separated top and bottom belts 952, each passing over a series of rollers to convey the fibrous webs 755A, 755B and film facing layers 815, 840 and 915 through the laminator 950. Rollers 956 are positioned at the entry of the laminator 950 to lightly press the materials (755A, 755B, 815, 840 and 915) together (at step 1160) as they enter the laminator 950. Laminator 950 has a heating section 962 and a cooling section 964 for successively heating then cooling the material layers (755A, 755B, 815, 840 and 915) as they pass through. A nip roller 968 is located on both top and bottom belts 952 in between the heating and cooling sections 962, 964 to slightly compress the heated material layers (755A, 755B, 815, 840 and 915) together at step 1170 before they are cooled, at step 1180 to fix the adhesion of the bi-component fibres of fibrous web 755A with the film layer 915. The pressing at step 1160 and light compression at step 1170 also serves to aid adhesion of the film layer 815 with fibrous web 755A by means of the adhesive substance 922. The heating section 962 of laminate 950 is configured to heat the material to between about 140 degrees C. and about 160 degrees C.

Conveyors (not shown) may be used to carry the fibrous web layer 755A and film layer 915 into flat bed laminator 950, along with the preformed sound absorption material 940 comprising the second layer of fibrous web 755B with film layers 815 and 840, for heating and slight compression (at steps 1160 and 1170). The flat bed laminator 950 applies a relatively low pressure to these materials to achieve adhesion between the fibrous web 755A and film layer 815 via adhesive substance 922 and between fibrous web 755A and film 915 via adhesion of the sheath material of the bi-component fibres blended into fibrous web 755A with film layer 915.

The output of flat bed laminator 956 is shown in a larger scale in FIG. 10 as double layered sound absorption material 1000. FIG. 10 is not to-scale and is provided for illustrative purposes, not as a physically and dimensionally accurate representation of the described embodiments. Some embodiments employ vertical lapping as part of the web formation process, so the vertically oriented wave forms in fibrous webs 755A and 755B illustrated in FIG. 10 are intended only to indicate this vertical lapping as one kind of possible web form, rather than to illustrate a specific fibre shape, structure or dimension.

Sound absorption material 1000 has two fibrous web layers 755A and 755B, with a thin facing layer 815 therebetween and thin facing layers 840 and 915 on the outer faces of the resultant composite sound absorption material 1000. Depending on the bonding process, an adhesive layer may be formed fey adhesive powder 922 or another adhesive substance. Sound absorption material 1000 may have a thickness X of about 10 mm to about 80 mm, for example. Fibrous web layers 755A and 755B may have approximately the same thickness or may have different thicknesses. Additionally, thin facing layers 815, 840 and 915 may comprise essentially the same material or may be formed of different materials, provided that those materials are adhesively compatible with the sheath material of the bi-component fibres blended into the fibrous web layers 755A and 755B.

The material characteristics of the fibrous webs 755A and 755B, the thin facing layers 815, 840 and 915 are as described as above. While FIG. 10 shows the fibrous web layers 755A and 755B as being vertically lapped, other suitable fibrous web structures may be employed.

The embodiments described herein, in relation to FIGS. 1 and 7 to 11 are presented by way of example only. Where appropriate, alternative systems, methods and materials can be substituted for those described, provided that similar features and functions are obtained as described herein.

EXAMPLES

Several samples of fibrous web wore prepared, each being a vertically lapped thermally bonded non-woven web with a nominal web weight of between 200 gsm and 400 gsm and approximately 3-5 mm thicker than the required finished product. Some of the fibrous webs (Blend 1) have a staple polyester fibre blended with a bi-component adhesive fibre comprising a co-polyester sheath and polyester core. The remaining fibrous webs (Blend 2) have a polyester fibre blended with an adhesive fibre consisting of a polyethylene sheath with an polyester core in lieu of the polyester bi-component fibre. Details of each Blend appear in Table 1.

TABLE 1

| Fibre Blend | 1 | 2 |
| --- | --- | --- |
| 2Denier bicomponent (CoPET/PET) | 30% | |
| 2Denier bicomponent polyolefin/polyester fibre | | 30% |
| 3Denier regenerated PET RSF (regular staple fibre) | 40% | 40% |
| 12Denier SHCSF (spiral hollow conjugate staple fibre) PET | 30% | 30% |
| Nominal web density, g/m². | 200 | 350 |
| Laminating temperature, C. | 150 | 150 |
| Laminating belt speed, m/minute | 5 | 5 |

Plastic films were then laminated to the webs using a Schaetti flat-bed laminator. Similar laminators are provided by Meyer, Reliant and Glenro. In each case, the laminator belts were heated and the belt height was set to the required finished thickness. The samples were run through the laminator at a speed of about 5 m/minute.

Comparative examples were produced using conventional adhesive-type Films that are re-activated by the heat of the dry-lamination process. A 25 micron polyurethane thermoplastic film, manufactured by Ding Zing of Taiwan, was laminated to webs produced from Blend 1, referred to as Example 1 during testing.

A 20 micron unslit co-extruded hot melt film, type Xiro V4712, manufactured by Collano of Switzerland, was laminated to webs produced from Blend 1, referred to as Examples 4 and 7 during testing. A further layer of Xiro V4712 was also laminated to the other side to form a double sided product, referred to as Example 9 during testing.

A 15 micron linear low density polyethylene (LLDPE) cast coextruded 3-layer film was provided as a surface facing to be laminated to webs produced from Blends 1 and 2. This film, although thermoplastic, would not adhere to Blend 1 during the lamination process, without the application of a low density polyethylene (LDPE) adhesive powder of 500 micron particle size, referred to as Examples 3 and 6 during testing.

The same LLDPE film was laminated to Blend 2 during the lamination process and adhered successfully without the need for adhesive powder, referred to as Examples 2, 5 and 8 during testing. The PE sheath on the PE/PET bi-component binder has a lower melting point than the LLDPE film and suitable melt-flow and adhesive properties that render it as an, excellent adhesive for LLDPE film, thus providing an adhesive that is incorporated into the web itself, making it unnecessary to use a thermoplastic adhesive film, or an additional adhesive, such as an adhesive powder. A further LLDPE film layer was laminated to the other side of the laminate to form a double sided product, referred to as Example 10 during testing.

The samples were then tested for sound absorption in an impedance tube using the two microphone technique, in accordance with ASTM 1050E.

The sound absorption of the samples produced front Blend 2, laminated with the LLDPE film exhibited measurably higher sound absorption than all of the other samples.

Figure 2:
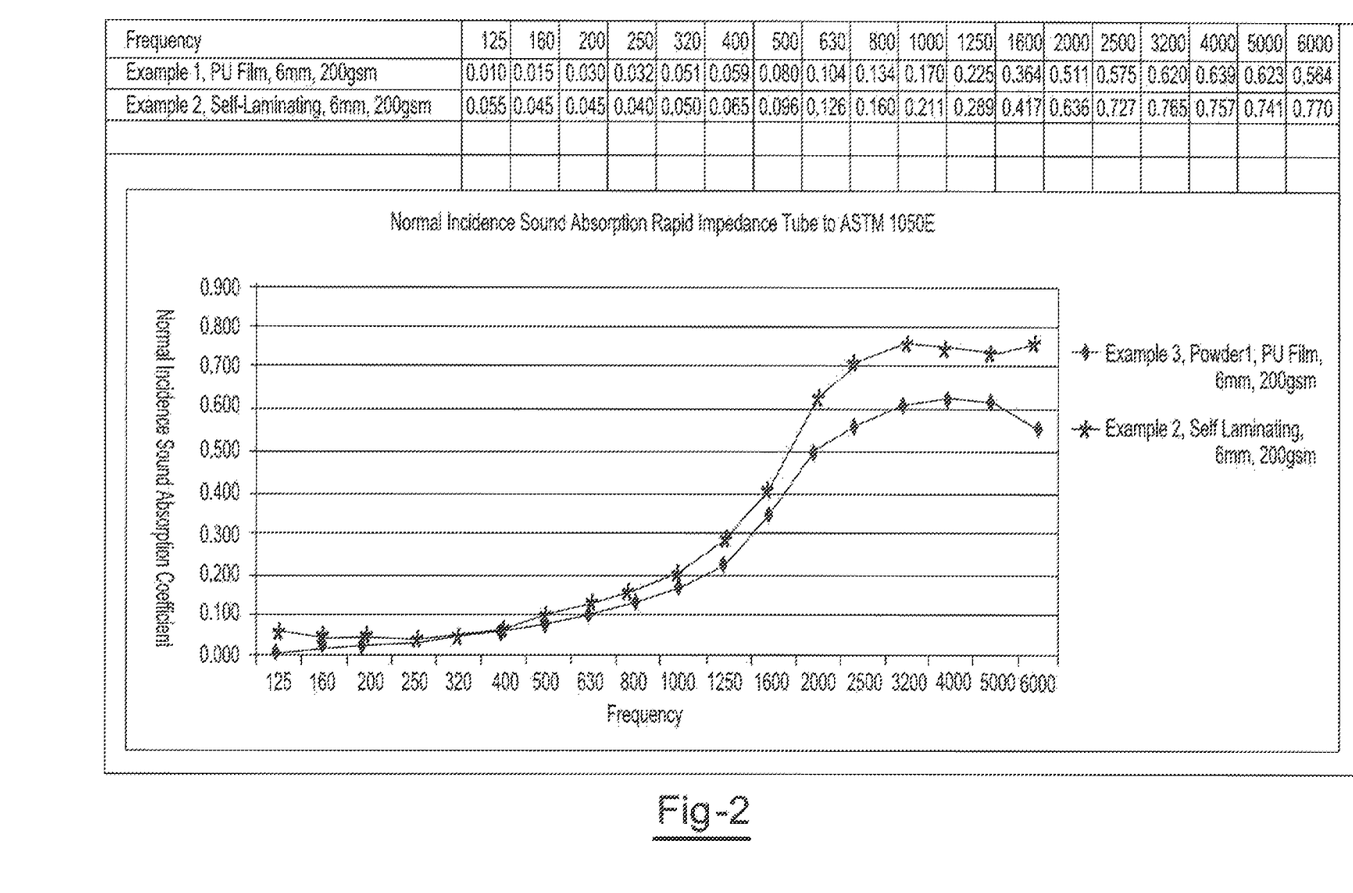
FIG. 2 is a plot of sound absorption coefficient against frequency for Examples 1 and 2.

From FIG. 2, increased sound absorption can be seen in the self-laminating web, (Example 2) compared to a thermoplastic polyurethane hot melt film (Example 1), particularly at frequencies above 400 Hz.

Figure 3:
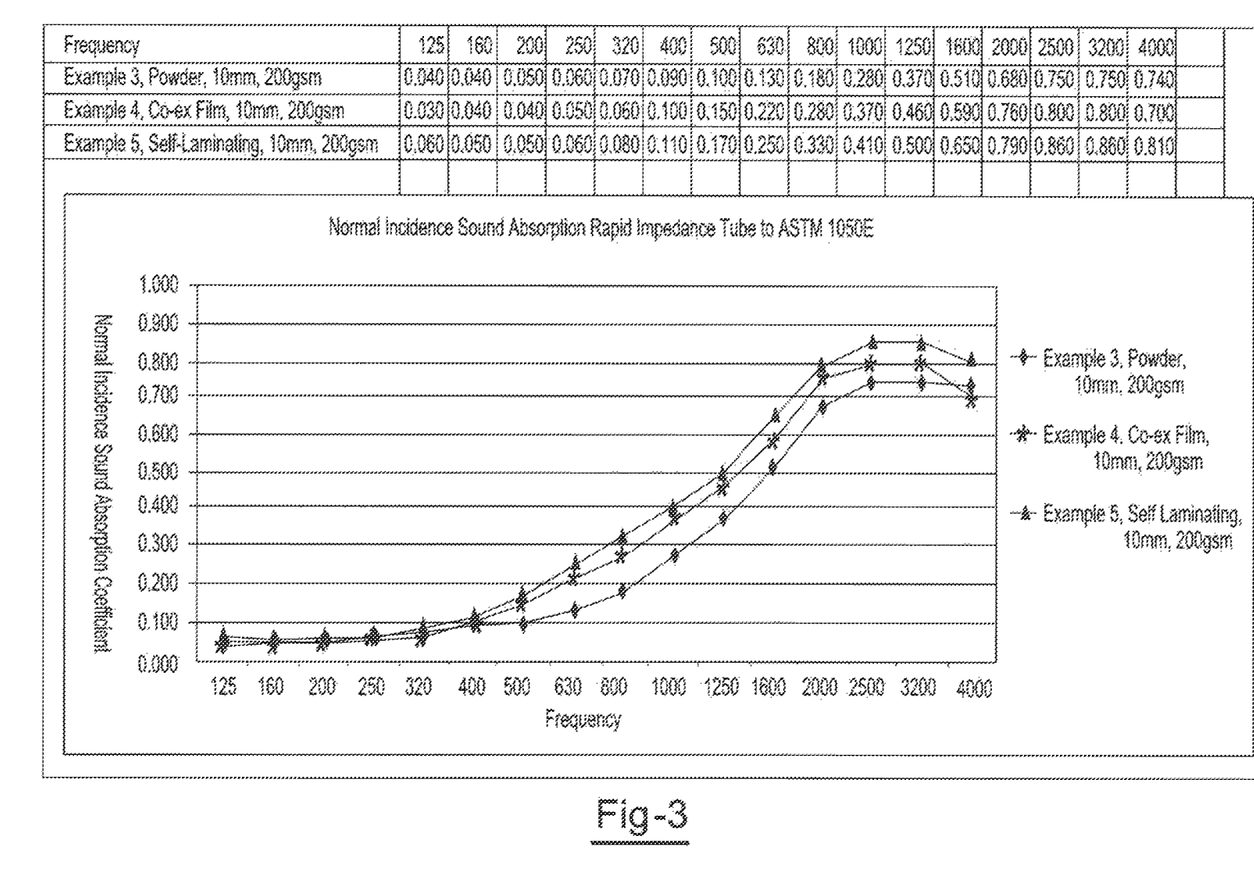
FIG. 3 is a plot of sound absorption coefficient against frequency for Examples 3, 4

From FIG. 3, increased sound absorption can be seen in the sound absorption material formed using the self-laminating LLDPE film (Example 5), when compared to powder laminated (Example 3) and co-extruded hot melt films (Example 4), particularly at frequencies above 400 Hz.

Figure 4:
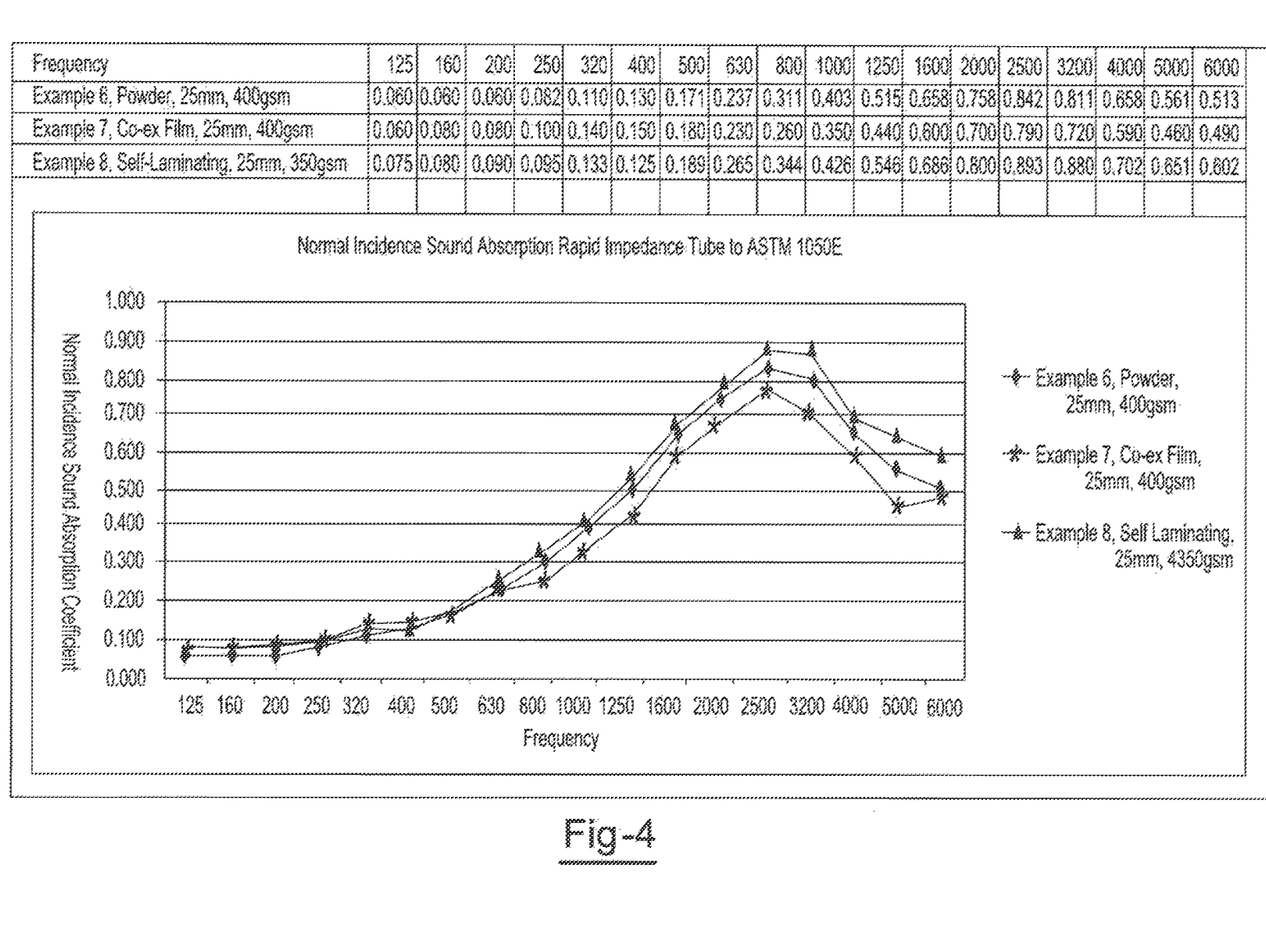
FIG. 4 is a plot of sound absorption coefficient against frequency for Examples 6, 7 and 8.

From FIG. 4, increased sound absorption can be seen in the self-laminating web (Example 8), compared to powder laminated (Example 6) and hot melt films (Example 7). For these examples, the sound absorption is greater than for previous examples, due to the higher web density compared to these examples. In particular, Example 6 has a web density of 400 gsm whilst Example 8 has a web density of only 350 gsm. Both use the same film laminated with either powder or with the self-laminating web. Despite the higher web mass in Example 6, the sound absorption is still significantly less than for Example 8, indicating that the improvement in sound absorption through the use of the self-laminating web is significantly greater than achieved by an increase in web weight.

Figure 5:
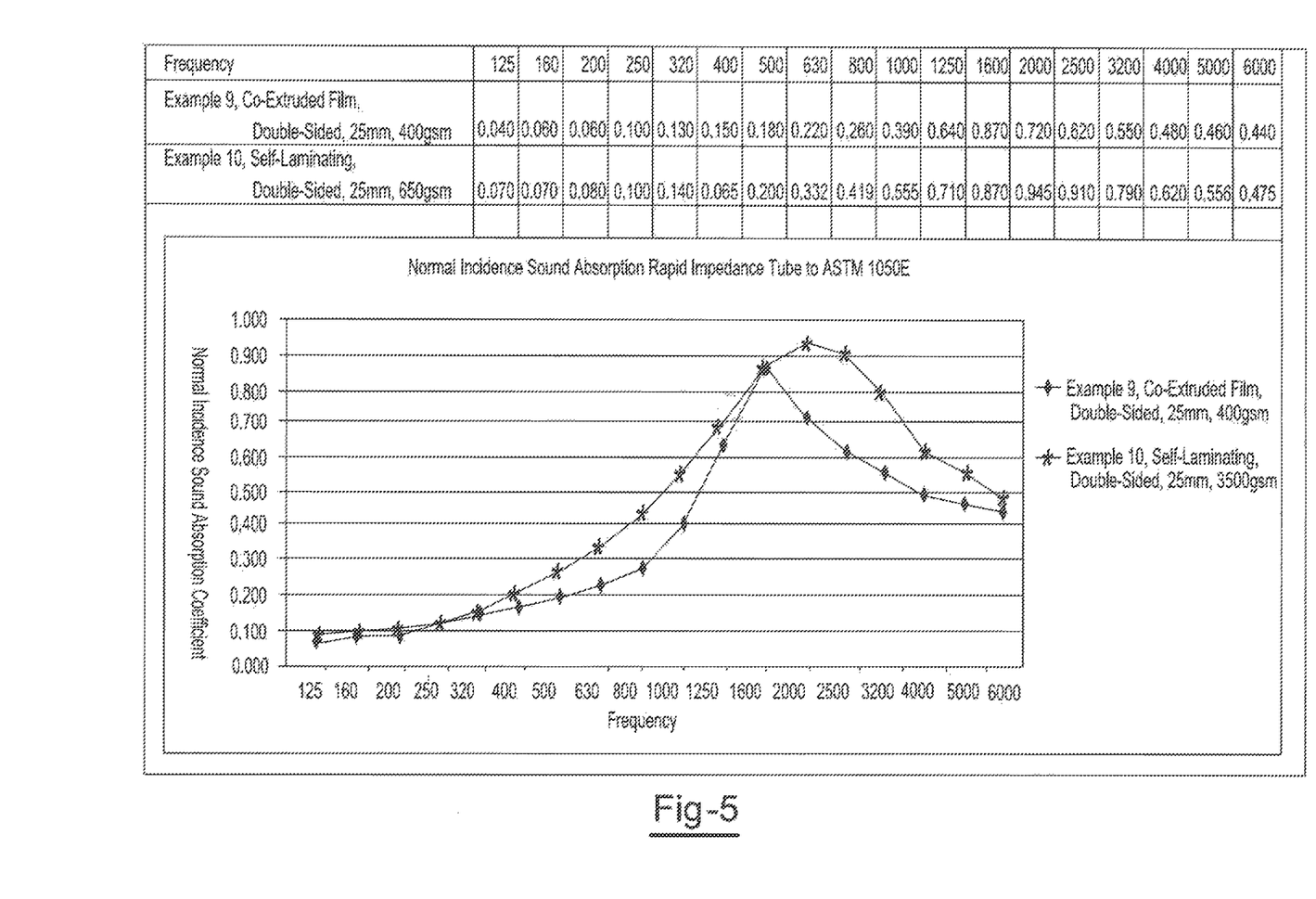
FIG. 5 is a plot of sound absorption coefficient against frequency for Examples 9 and 10.

From FIG. 5, laminating a film to both sides of the web further improves the sound absorption of a film-laminated web, but more particularly so in the case of the self-laminating web. Example 10 demonstrates a large increase in sound absorption compared to Example 9. Again this is despite the higher mass of the web in Example 9, which would normally imply greater sound absorption.

A hybrid blend of Blend 1 (e.g. 15%) and Blend 2 (e.g. 15%) may be used to similar sound absorption effect.

In Examples 11, 12 and 13, two layers of film faced sound absorption materials were combined, one on top of the other, as shown and described in relation to FIGS. 9, 10 and 11. The sound absorption was measured according to ISO 1050, but only using a small 27 mm tube. The material properties of the double-layered sound absorption material are provided in Table 2 below,

TABLE 2

|  | Example 11 | Example 12 | Example 13 |
|---|---|---|---|
| Film Description | Linear Low Density Polyethylene clear embossed film 15 μm (app 14.5 gsm) | Linear Low Density Polyethylene clear embossed film 15 μm (app 14.5 gsm) | Linear Low Density Polyethylene clear embossed film 15 μm (app 14.5 gsm) |
| Adhesive mechanism | Adhesive fibres | Adhesive fibres | Adhesive fibres & LDPE adhesive powder |
| Nominal web density, g/$m^2$, layer 1 | 350 | 200 | 200 |
| Nominal web density, g/$m^2$, layer 2 | 350 | 350 | 350 |
| Nominal thickness, mm, layer 1 | 20 | 17 | 16 |
| Nominal thickness, mm, layer 2 | 20 | 23 | 23 |
| Nominal total thickness, mm | 40 | 40 | 39 |

Figure 12:
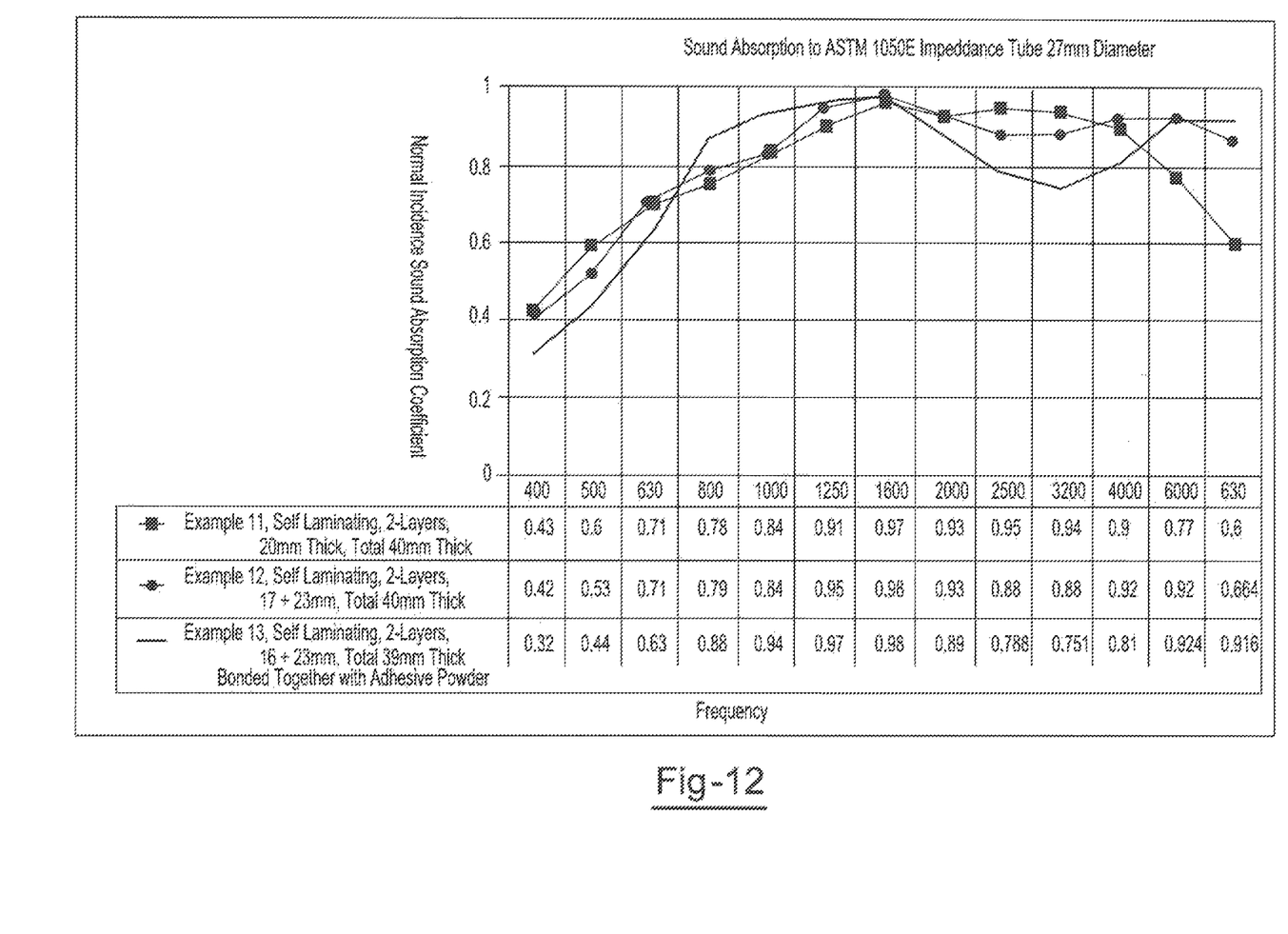
FIG. 12 is a plot of sound absorption coefficient against frequency for Examples 11, 12 and 13.

As FIG. 12 illustrates, the results indicate a substantial boost in lower frequency sound absorption, without compromising the high frequency sound absorption characteristics. It suggests an increase in sound absorption achieved by creating a multi-layer composite of the self-laminating sound absorption material 200, when constructed as described herein and according to Examples 11, 12 and 13.

Acoustic weight efficiency is defined as the noise reduction coefficient (NRC) divided by the mass of the material. The NRC is the average of the sound absorption coefficients measured at each of the frequencies of 250, 500, 1000, and 2000 Hz. The acoustic weight efficiency of some described, embodiments and/or samples is appreciably higher than commercial products, such as acoustic felts produced by The Smith Family of Sydney, Australia. The inventors consider that the described embodiments provide sound absorption materials that provide higher sound absorption performance with lighter weight. This feature cars be important in automotive applications as a weight reduction can improve the fuel economy of vehicles using sound absorption materials.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Embodiments have been described herein with reference to the figures and examples. However, some modifications to the described embodiments and/or examples may be made without departing from the spirit and scope of the described embodiments, as described in the appended claims.

The invention claimed is:

1. A method of manufacturing a sound absorption material, the method comprising:
   forming a low density fibrous web to act as a porous bulk absorber, the fibrous web containing a proportion of bi-component fibers, each bi-component fiber having a core material and a sheath material around the core material, the sheath material having a lower melting point than the core material;
   applying a thin facing layer to the low density fibrous web, wherein the facing layer is adhesively compatible with the sheath material; heating the fibrous web to a temperature sufficient to soften the sheath material of at least some of the bi-component fiber;
   pressing the facing layer and fibrous web together under low pressure such that at least part of the facing layer contacts the softened sheath material of at least some of the bi-component fibers to form an adhesive bond between the facing layer and the fibrous web.

2. The method of claim 1, wherein the thin facing layer comprises material selected from the group consisting of polymer films, foils and fabrics.

3. The method of claim 1, wherein the thin facing layer comprises material selected from the group consisting of polyethylene, polyester, polyamide and polypropylene.

4. The method of claim 1, wherein the low density fibrous web has an air flow resistivity of more than about 1,100 mks Rayls/m and less than about 60,000 mks Rayls/m.

5. The method of claim 1, wherein the fibrous web comprises a thermally bonded non-woven fabric.

6. The method of claim 1, wherein the fibrous web comprises a vertically lapped fibrous web.

7. The method of claim 1, wherein the sheath material of the bi-component fibers is selected from the group consisting of polyethylene, polyamide, polypropylene and co-polyester.

8. The method of claim 1, wherein the thin facing layer comprises a film layer having a thickness of between about 5 and about 100 microns.

9. The method of claim 1, wherein the thickness of the film layer is between about 10 microns and about 25 microns.

10. The method of claim 1, wherein the fibrous web has a thickness of between about 4 mm and about 50 mm.

11. The method of claim 1, wherein the method further comprises applying a second facing layer to the fibrous web, the second facing layer being adhesively compatible with the sheath.

12. The method of claim 11 wherein the facing layer and second facing layer each comprise a film layer of the same material.

13. The method of claim 11 wherein the facing layer and second facing layer each comprise a film layer of a different material.

14. The method of claim 1, wherein the method includes applying a dry thermoplastic hot melt resin to one or more layers.

15. The method of claim 11, including pressing a second low density fibrous web together with the second facing layer.

16. The method of claim 15, including heating the second fibrous web to a temperature sufficient to soften the sheath material of at least some of the bi-component fibers.

17. The method of claim 15, including applying an adhesive substance to the second low density fibrous web.

18. The method of claim 17, including activating the adhesive substance.

19. The method of claim 18, wherein the adhesive substance is a heat-activated substance.

20. A sound absorption material formed by the method of claim 1.

* * * * *